Jan. 24, 1961 A. A. HICKS 2,968,838

THREE-DIMENSIONAL DIE

Filed Jan. 29, 1959 2 Sheets-Sheet 1

INVENTOR.
ALAN A. HICKS

BY

Brumbaugh, Free, Graves & Donohue his ATTORNEYS

Jan. 24, 1961 A. A. HICKS 2,968,838

THREE-DIMENSIONAL DIE

Filed Jan. 29, 1959 2 Sheets-Sheet 2

INVENTOR.
ALAN A. HICKS
BY
Brumbaugh, Free, Graves & Donohue
his ATTORNEYS

United States Patent Office 2,968,838
Patented Jan. 24, 1961

2,968,838

THREE-DIMENSIONAL DIE

Alan A. Hicks, 240 E. 79th St., New York, N.Y.

Filed Jan. 29, 1959, Ser. No. 789,928
7 Claims. (Cl. 18—34)

This invention relates to flat surfaces having a three-dimensional appearance and, more particularly, to the preparation of a new and improved die capable of impressing a three-dimensional pattern on a flat surface.

In preparing certain impressionable materials, such as plastics, for example, it is often desirable to provide decorative patterns and the like having a three-dimensional appearance on flat surfaces of the material. However, in order to give the appearance of a three-dimensional object to a flat surface, the surface must be formed into a large number of minute surface segments, each of which has the conformation of a corresponding portion of the object but lies in the plane of the flat surface. Although a die for producing a very coarse three-dimensional pattern of this type might be prepared by intricate carving of a flat surface, as a practical matter it would be impossible to prepare a die of an irregular or non-uniform pattern in that manner having a sufficiently large number of surface segments per unit area to provide a realistic three-dimensional effect.

Accordingly, it is an object of this invention to provide a new and improved die capable of impressing a three-dimensional pattern on a flat surface.

Another object of the invention is to provide a die of the above character whereby irregular and non-uniform three-dimensional patterns may be produced on a flat surface in a simple and convenient manner.

A further object of the invention is to provide a method for preparing a flat surface three-dimensional die of the above character.

These and other objects of the invention are attained by shaping the end of a bundle of longitudinal elements into the desired three-dimensional pattern and bringing the shaped ends of all the elements in the bundle into coplanar relation. More particularly, a large number of small cross-section wires is gathered into a bundle and, in one embodiment, each of the wires is provided with at least one keying surface so that relative rotation is prevented. This may be done by utilizing relatively soft wires and compressing the bundle perpendicularly to the longitudinal direction of the wires or by utilizing wires of polygonal cross-section.

Further objects and advantages of the invention will be apparent from a reading of the following description in conjunction with the accompanying drawings in which.

Figure 1:
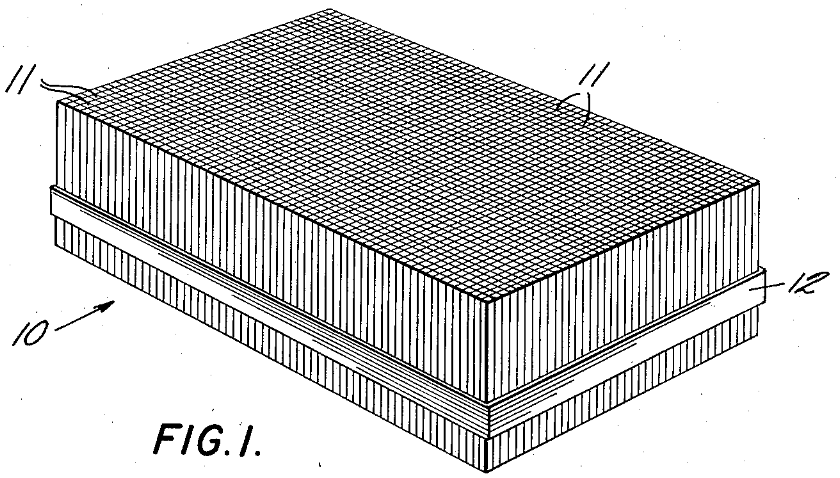
Fig. 1 is a perspective view illustrating a typical bundle of longitudinal elements prepared for use in accordance with the invention.

In the preparation of the typical die illustrated in the drawings, a bundle 10 composed of a large number of wires 11 having square cross-section is held together by a peripheral band 12. When tightened about the bundle, the band 12 holds all the wires 11 in fixed longitudinal relation, but for purposes to be described hereinafter, the band is preferably arranged in any conventional manner to be loosened slightly so as to permit longitudinal motion of the wires with respect to each other either freely or under pressure while retaining them in the form of a bundle.

Preferably, the wires 11 are of non-circular cross-section, such as the square wires of the typical embodiment of the invention illustrated in the drawings, to provide contiguous keying surfaces preventing relative rotation of the wires. Wires of any other polygonal shape which provide contiguous keying surfaces on adjacent wires so as to prevent relative rotation may also be used or, if the material of the wires is sufficiently soft, the wires may initially be round and keying surfaces may be impressed by compressing the bundle perpendicularly to the longitudinal axis of the wires. Utilization of wires having contiguous surfaces is also preferable since this arrangement eliminates any gaps between the wires which might result in imperfections in a molded reproduction made from the die.

However, if sufficient tension is maintained on the band 12 while the ends of the wires are being brought into coplanar relation in the manner described below, relative rotation is effectively prevented and no keying surfaces need be provided. If a die prepared in this manner is used to impress a flat surface to produce reproductions, relatively little material will flow into gaps between adjacent wires and the impression produced is substantially perfect. Also, the diameter of the wires 11 is selected according to the fineness of the desired pattern and, if very fine wires are utilized the gaps between adjacent wires are too small to permit appreciable flowing. In order to provide a realistic effect in the reproduced impression at close range, the wire diameter is preferably about 0.030 inch or less.

Figure 2:
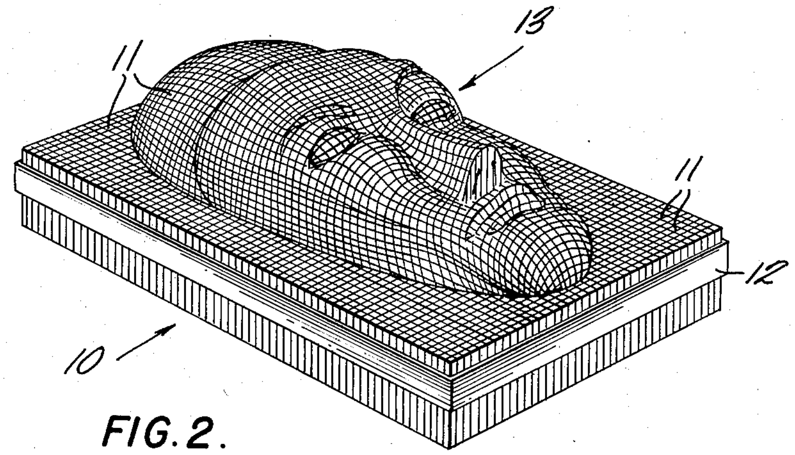
Fig. 2 is a view in perspective showing a bundle of elements having one end shaped into a three-dimensional pattern.
Figure 3:
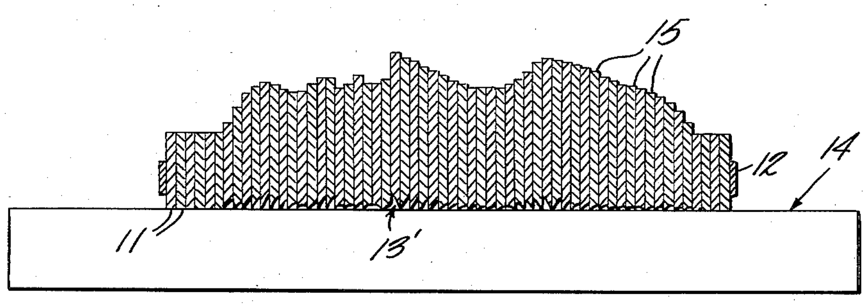
Fig. 3 is a sectional view through the shaped bundle of Fig. 2 after the shaped ends of the longitudinal elements have been brought into coplanar relation in accordance with the invention.

As illustrated in Fig. 2, one end of the bundle is shaped as by carving, for example, into a positive or negative three-dimensional pattern 13 to represent the object which it is desired to duplicate on a flat surface. As a result, the end of each wire 11 is formed with the contour of a correspondingly located portion of the surface of the object. In the illustrated example, a positive representation of the object is shown and, if it is desired to reproduce a positive impression on a flat surface, an intermediate negative die must be prepared. However, if the end of the bundle 10 is shaped with a negative three-dimensional pattern, the finished die prepared from the bundle may be used to reproduce positive impressions directly.

After the end of the bundle has been formed, the shaped ends of all the wires 11 are brought into coplanar relation. If keying surfaces are provided on the wires, this may be done by turning the bundle upside down and loosening the band 12 sufficiently to permit these ends to fall freely against a flat surface 14. If the wires have no keying surfaces, the band 12 is loosened sufficiently to permit relative motion of the wires under pressure but to prevent free motion. In this case, pressure is applied to the unshaped ends 15 of the wires 11 by a resilient rubber pad, for example, to press the carved ends against the flat surface and frictional contact between the sides of the wires prevents any appreciable rotation thereof.

Figure 4:
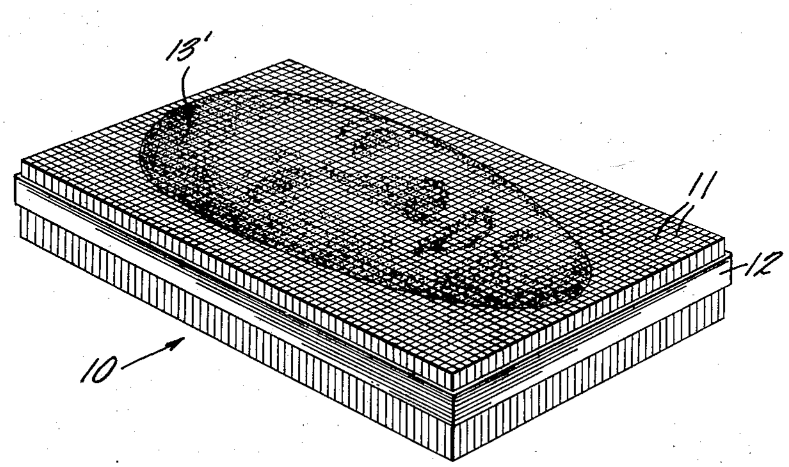
Fig. 4 is a view in perspective of a completed die showing the shaped ends of the longitudinal elements.

The band 12 is then tightened to maintain the wires in longitudinally fixed relative positions and the bundle is removed from the flat surface. As illustrated in Fig. 4, by virtue of the contours at the ends of the wires, the end of the bundle now presents a flat representation 13' having the optical appearance of the three-dimensional pattern 13 which was carved into the end of the bundle 10. The bundle of wires prepared in this manner may be used directly as a die to form molds or impressions in the usual manner on a flat sheet of plastic or the like. In this case, it may be desirable to cut the projecting uncarved ends 15 of the die to form a flat surface and provide a suitable support block for the back of the die. Inasmuch as flat surface reproductions made in this manner are composed of a large number of surface segments which are complementary in shape to those of the die, they produce a three-dimensional pattern which is the negative of the original carved pattern 13.

If positive reproductions are desired, a permanent negative die may be made in any conventional way from the positive die prepared in the above manner and this die may be used to provide positive impressions. Also, if reproductions are to be made with a rotary press, a flexible die capable of conforming to the press roll and which is the negative of the impression desired should be made from the original die.

It will be readily apparent that the above described method provides a simple and efficient way of preparing a die capable of producing an impression of a three-dimensional object on a flat surface. Furthermore, dies prepared in this manner are capable of producing impressions of non-uniform and irregular patterns in much finer detail than has been heretofore possible.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A method for preparing a die adapted to produce a three-dimensional impression on a flat surface comprising binding a plurality of wires into a bundle, shaping one end of the bundle into the desired three-dimensional pattern, loosening the binding and bringing the shaped ends of the wires into coplanar relation while preventing relative rotation thereof, and tightening the binding to hold the wires in fixed positions in the bundle.

2. A method for preparing a die adapted to produce a three-dimensional impression on a flat surface comprising binding a plurality of wires into a bundle so that the wires have contiguous keying surfaces preventing relative rotation, shaping one end of the bundle of wires into the desired three-dimensional pattern, loosening the binding and permitting the shaped ends of the wires to fall against a flat surface, and tightening the binding to hold the wires in fixed positions in the bundle.

3. A method for preparing a die adapted to produce a three-dimensional impression on a flat surface comprising binding a plurality of relatively soft wires into a bundle, compressing the bundle to produce contiguous keying surfaces on the wires, shaping one end of the bundle of wires into the desired three-dimensional pattern, and bringing the shaped ends of the wires into coplanar relation.

4. A method for preparing a die adapted to produce a three-dimensional impression on a flat surface comprising binding a plurality of relatively soft wires into a bundle, compressing the bundle to produce contiguous keying surfaces on the wires, shaping one end of the bundle of wires into the desired three-dimensional pattern, loosening the binding and permitting the shaped ends of the wires to fall against a flat surface, and tightening the binding to hold the wires in fixed positions in the bundle.

5. A three-dimensional die comprising a plurality of wires included in a bundle, each having one end shaped with a corresponding portion of an irregular three-dimensional surface, the shape of the end of each wire being related to the shape of the ends of the adjacent wires in the bundle in a unique manner so as to produce the impression of an irregular three-dimensional surface, the highest points of all the shaped ends being in coplanar relation.

6. A three-dimensional die according to claim 5 wherein each of the wires has a polygonal cross-section.

7. A three-dimensional die comprising a plurality of wires at least some of which have one end shaped with a corresponding portion of an irregular three-dimensional surface, the shape of the end of each of the shaped wires being related to the shape of the ends of the adjacent wires in a unique manner so as to produce the impression of an irregular three-dimensional surface, and binding means holding the wires in fixed longitudinal relation with the highest points of all the shaped ends in coplanar relation.

References Cited in the file of this patent

UNITED STATES PATENTS

| | | |
|---|---|---|
| 1,591,572 | Stimson | July 6, 1926 |
| 2,441,747 | Beshgetoor | May 18, 1948 |
| 2,716,909 | Rupert | Sept. 6, 1955 |

FOREIGN PATENTS

| | | |
|---|---|---|
| 213,944 | Switzerland | Mar. 31, 1941 |